United States Patent
Stockwell et al.

(10) Patent No.: US 9,690,869 B2
(45) Date of Patent: Jun. 27, 2017

(54) SYSTEMS AND METHODS FOR PREDICTIVE CACHING OF DIGITAL CONTENT

(71) Applicant: Dropbox, Inc., San Francisco, CA (US)

(72) Inventors: Will Stockwell, San Francisco, CA (US); Alex Sydell, San Francisco, CA (US); Tony Grue, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 569 days.

(21) Appl. No.: 13/766,425

(22) Filed: Feb. 13, 2013

(65) Prior Publication Data

US 2014/0189037 A1 Jul. 3, 2014

Related U.S. Application Data

(60) Provisional application No. 61/746,474, filed on Dec. 27, 2012.

(51) Int. Cl.
| | |
|---|---|
| *G06F 15/16* | (2006.01) |
| *G06F 15/167* | (2006.01) |
| *G06F 17/30* | (2006.01) |
| *G06F 3/023* | (2006.01) |

(52) U.S. Cl.
CPC ...... *G06F 17/30902* (2013.01); *G06F 3/0237* (2013.01)

(58) Field of Classification Search
CPC .. H04N 21/80; H04N 21/432; H04N 21/4331; H04N 21/4668; H04N 21/458; H04N 21/44209; H04L 29/08; H04L 67/10; H04L 67/22; H04L 63/061; H04L 65/4084; H04L 67/306; H04L 2463/101; G06F 15/167
USPC ................................ 709/217, 219, 223, 224
See application file for complete search history.

(56) References Cited

U.S. PATENT DOCUMENTS

| | | | | |
|---|---|---|---|---|
| 5,878,223 | A * | 3/1999 | Becker et al. | 709/223 |
| 8,832,003 | B1 * | 9/2014 | Bowers et al. | 706/12 |
| 2005/0055426 | A1 * | 3/2005 | Smith | G06F 17/30902 709/219 |
| 2009/0037382 | A1 * | 2/2009 | Ansari et al. | 707/3 |
| 2009/0077195 | A1 * | 3/2009 | Gibbs et al. | 709/217 |
| 2009/0160735 | A1 * | 6/2009 | Mack | G06Q 30/02 345/2.3 |
| 2010/0030872 | A1 * | 2/2010 | Caleca et al. | 709/219 |

(Continued)

*Primary Examiner* — Aftab N. Khan
(74) *Attorney, Agent, or Firm* — Polsinelli PC

(57) ABSTRACT

A system for predictively caching digital content in which the system is configured to: (1) receive, from a user of a client device, a request to access at least one particular digital file stored on a remote server; (2) select at least one other digital file to cache locally on the client device based on at least one file-accessing tendency of the user; (3) download the at least one other digital file from the remote server to the client device; and (4) save the downloaded digital file to memory associated with the client device for later access by the user. A file-accessing tendency of the user may include the manner in which the user typically scrolls or otherwise cycles through images or other files. The system may determine the user's file-accessing tendencies based on, for example, the user's location, native language, past content-accessing practices, and/or specified user preferences.

19 Claims, 5 Drawing Sheets

(56) References Cited

U.S. PATENT DOCUMENTS

| | | | |
|---|---|---|---|
| 2010/0057687 A1* | 3/2010 | Shen | G06F 17/3064 |
| 2010/0131443 A1* | 5/2010 | Agarwal | G06F 17/30867 |
| | | | 706/46 |
| 2010/0161831 A1* | 6/2010 | Haas | G06F 15/173 |
| | | | 709/235 |
| 2011/0035656 A1* | 2/2011 | King | G06F 17/211 |
| | | | 715/234 |
| 2012/0005041 A1* | 1/2012 | Mehta | G06Q 30/0601 |
| | | | 705/27.1 |
| 2012/0023226 A1* | 1/2012 | Petersen et al. | 709/224 |
| 2012/0222065 A1* | 8/2012 | Prins | H04N 21/432 |
| | | | 725/32 |
| 2012/0236201 A1* | 9/2012 | Larsen | H04N 21/235 |
| | | | 348/468 |
| 2014/0059156 A1* | 2/2014 | Freeman, II | H04L 67/10 |
| | | | 709/213 |

* cited by examiner

SYSTEMS AND METHODS FOR PREDICTIVE CACHING OF DIGITAL CONTENT

CLAIM OF PRIORITY

This claims the benefit of priority under 35 U.S.C. §119 (e) to U.S. Provisional Patent Application No. 61/746,474, filed Dec. 27, 2012, entitled, "Systems And Methods For Predictive Caching Of Digital Content," which is incorporated herein by reference in its entirety.

BACKGROUND

When accessing digital content on a computing device, users typically prefer to access the content as quickly as possible. In order to facilitate the desired quick access to centrally stored digital content on mobile devices, current systems may download and cache content before it is accessed by a user so that the content is available for quick, local access by the user. However, due to memory and storage limitations, it is often difficult to store local copies of all digital content that a user may wish to access. Accordingly, there is a need for improved systems for caching digital content for later access by a user.

SUMMARY

A computer system, according to various embodiments, comprises a processor and may be adapted for: (1) receiving, from a user, a request to access a digital file; (2) selecting at least one other particular digital file to cache locally based on at least one content-accessing tendency of the user; (3) downloading the at least one particular digital file from a remote server; and (4) saving the downloaded digital file to local cache memory for later access by the user. In various embodiments, the system is adapted for determining the at least one content-accessing tendency based on the user's geographic location, the user's native language, the user's past content-accessing practices (e.g., as observed by the system), and/or at least one preference received from the user. The user's content-accessing tendency may include, for example, the direction in which the user typically swipes their finger when accessing a sequence of files on a touch screen, such as the touch screen of a mobile device.

A computer-implemented method, according to particular embodiments, comprises: (1) receiving, from a user, a request to access particular digital content; (2) selecting, by a processor, other particular digital content to cache locally based on at least one content-accessing tendency of the user; (3) downloading the other particular digital content from a remote server; and (4) saving the downloaded other particular digital content to local memory for later access by the user.

A computer-readable medium, according to various embodiments, stores computer-executable instructions for: (1) receiving a request to access particular digital content; (2) selecting other particular digital content to cache locally based on at least one content-accessing tendency of the user; (3) downloading the other particular digital content from a synched content management system; and (4) saving the downloaded other particular digital content to local memory for later access by the user.

BRIEF DESCRIPTION OF THE DRAWINGS

Various embodiments of a computer system for predictive caching of files are described below. In the course of this description, reference will be made to the accompanying drawings, which are not necessarily drawn to scale, and wherein.

DETAILED DESCRIPTION OF VARIOUS EMBODIMENTS

Figure 1:
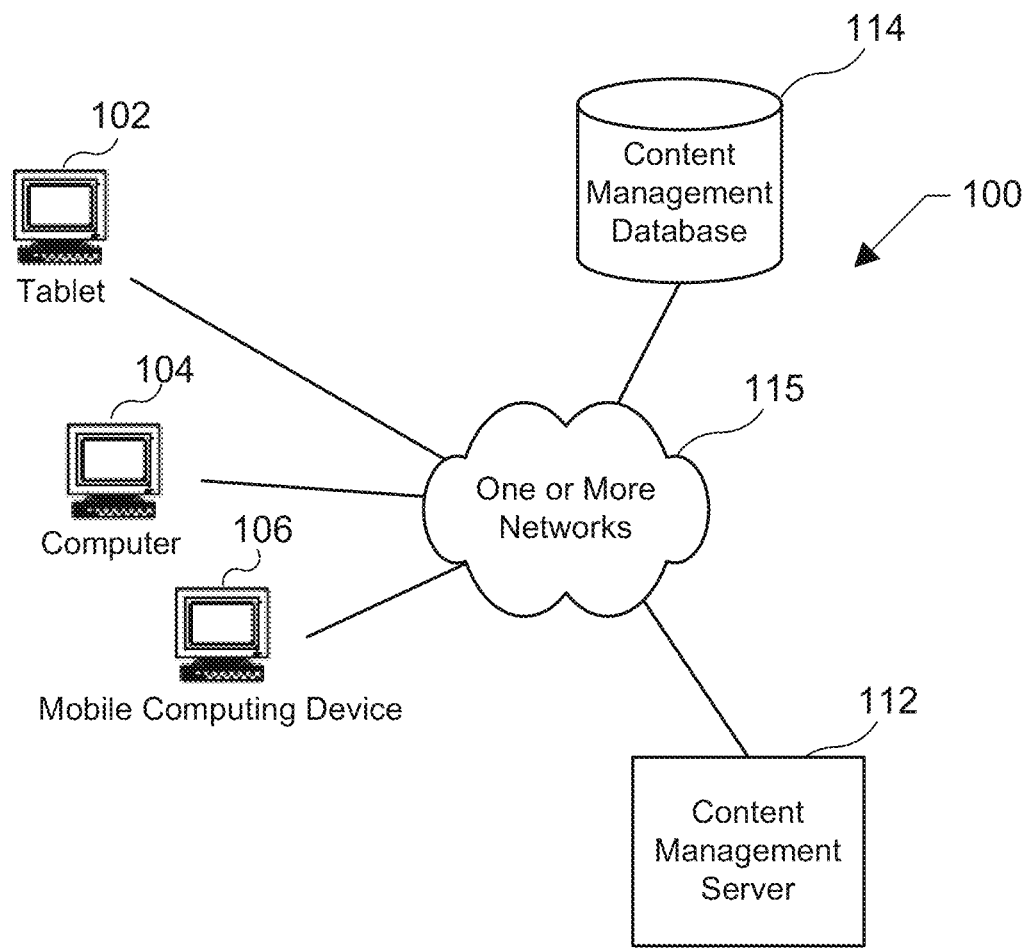
FIG. 1 shows a block diagram of a content management system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

A system for predictively caching digital content (e.g., such as files, folders of files, nested files, etc.) may be configured to strategically cache digital content that is stored centrally (e.g., by a synched, cloud-based content management service, such as the Dropbox™ service offered by Dropbox, Inc. of San Francisco, Calif.). For example, when a user uses a mobile device to accesses a particular folder of photos stored in a cloud-based content management system, various embodiments of the system may predict which of the photos the user is likely to access in the near future, and cache those photos locally on the mobile device for quick access by the user.

In a particular embodiment, the system may be configured to cache a particular number of files (e.g., image, text, or music files) that precede or follow a particular file (e.g., in a sequential listing of files) that the user is currently accessing. In various embodiments, the system may be configured to determine which digital content (e.g., files) to cache based on one or more tendencies of the user, such as the manner (e.g., direction) in which the user generally cycles through files (e.g., by using their finger to cycle left to right through a series of files, such as photos on a mobile device). This may help to assure: (1) that the user, when following their normal habits of accessing digital content, have quick access to the content; and (2) that the system does not waste resources on caching files that are unlikely to be accessed by the user in the immediate future.

In certain embodiments, the system may be configured to cache digital content that is related to digital content that a user has requested to access (e.g., view, read, or listen to). The related digital content may include other digital content in the same folder as the requested digital content, particular digital content contained in a listing of files or folders that the user has requested to access, or any other related digital content. Various embodiments of the system are described in greater detail below.

Exemplary Technical Platforms

As will be appreciated by one skilled in the relevant field, the present invention may be, for example, embodied as a computer system, a method, or a computer program product. Accordingly, various embodiments may be entirely hardware, entirely software, or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatus (e.g., systems), and computer program products. It should be understood that each element of the block diagrams and flowchart illustrations, and combinations of elements in the block diagrams and flowchart illustrations, respectively, can be implemented by a computer executing computer program instructions. These computer program instructions may be loaded onto a general purpose computer, a special purpose computer, a smart mobile device, or other programmable data processing apparatus to produce a machine. As such, the instructions which execute on the general purpose computer, special purpose computer, mobile device, or other programmable data processing apparatus create means for implementing the functions specified in the flowchart block or blocks. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, block diagram elements and flowchart illustrations support combinations of mechanisms for performing the specified functions, combinations of steps for performing the specified functions, and program instructions for performing the specified functions. It should also be understood that each block diagram element and flowchart illustration, and combinations of block diagram elements and flowchart illustrations, can be implemented by special purpose hardware-based computer systems that perform the specified functions or steps, or combinations of special purpose hardware and other hardware executing appropriate computer instructions.

Exemplary System Architecture

FIG. 1 is a block diagram of content management system 100 according to a particular embodiment. As may be understood from this figure, content management system 100 includes remote computing devices such as tablet computer 102, desktop or laptop computer 104, or mobile computing device 106 (e.g., a cellular phone, or any other portable device capable of transferring files over network 110) that are in communication with content management server 112 (which, for example, may be used to execute one or more modules as described below) and content management database 114 (which, for example, may be used to store the files on the content management system) via one or more networks 110. Network 110 between content management server 112 and remote computing devices 104, and 106 may be, for example, implemented via one or more wired or wireless networks such as LANs, WANs, a cellular network, a Wi-Fi network, or via the Internet. For purposes of ease of explanation and clarity, no specific network is shown in FIG. 1. Network 110 may include any of a variety of types of wired or wireless communication networks, such as the Internet. Mobile device 106 may transmit data wirelessly over a suitable cellular network by communicating with a cellular tower that may for example be coupled to network 110.

The users of each of desktop computer 104, and mobile device 106 may have file storage accounts with a content management service associated with the content management server 112. In various embodiments, content management server 112 may include one or more servers that are located in close physical proximity, or some servers may be locally together and others remote. In various embodiments, all such devices, wherever located, function as a system.

Content management server 112 may facilitate file access and file storage between content management server 112 and remote computing devices 104, 106. Content management server 112 receives files from and sends files to remote computing devices 104, 106 consistent with the user's preferences for sharing files. Content management server 112 may act as the counterpart to a client-side file storage service client application user interface that allows a user to manipulate files directly stored on content management server 112. In some embodiments, software operating on remote computing devices 104, 106 integrates network-stored files with the client's local file system to enable a user to manipulate network-stored files through the same user interface (UI) used to manipulate files on the local file system, e.g., via a file explorer, file finder or browser application. As an alternative or supplement to the client-side file-explorer interface, content management server 112 may provide a web interface for remote computing devices 104, 106 to access (e.g. via a web browser) and allow a user to manipulate files stored on content management server 112. In this way, the user can directly manipulate files stored on content management server 112.

In various embodiments, content management database 114 stores files such as those uploaded using remote computing devices 104, 106. It should be understood that, in various embodiments, content management database 114 may include multiple data stores—some local to, and some remote from, content management server 112.

Content management database 114 may maintain, for each user, information identifying the user, information describing the user's file directory, etc. in a file journal that is maintained for each user. In some embodiments, the file journal is maintained on content management server 112. This file journal may be updated periodically using information obtained directly from content management server 112 and/or from information obtained from one or more remote computing devices 104, 106. In this way, the server file journal stored on content management server 112 (hereinafter the "server-side file journal") is updated when a file is changed on the server or on an associated client device, such as remote computing device 104, 106. Content management server 112 then communicates with the associated client devices to assure that any relevant changes are reflected locally.

For example, if a user makes a change to a particular file on a first client device, the change may be reflected in the server-side file journal. The system then uses the server-side file journal to propagate the changes to the file to all client devices associated with the file. Such techniques may be implemented, for example, within the context of a synchronized file system such as the Dropbox™ service of Dropbox, Inc. of San Francisco, Calif.

Figure 2:
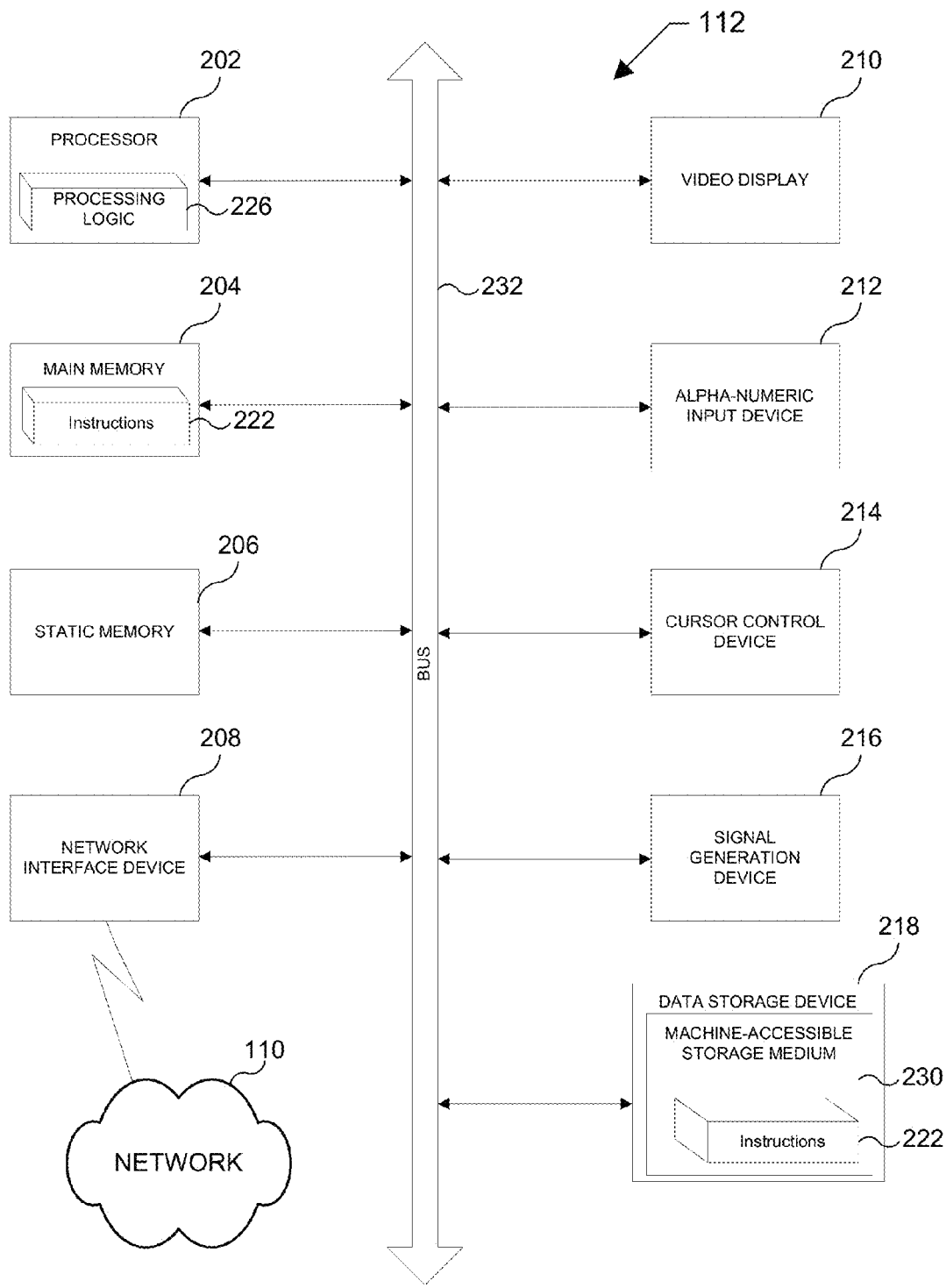
FIG. 2 shows a schematic diagram of a computer, such as the content management server of FIG. 1.

FIG. 2 illustrates a diagrammatic representation of computer 112 that can be used within content management system 100, for example, as client computer, or as content management server 112 (FIG. 1). For purposes of this disclosure, reference to a server or processor, shall be interpreted to include either a single server, a single processor, or multiple servers, or multiple processors.

In particular embodiments, computer 112 may be connected (e.g., networked) to other computers by a LAN, WAN, an intranet, an extranet, and/or the Internet. Computer 112 may operate in the capacity of a server or a client computer in a client-server network environment, or as a peer computer in a peer-to-peer (or distributed) network environment. Computer 112 may be personal computer (PC), tablet PC, mobile device, a web appliance, a server, a network router, a switch or bridge, or any computer capable of executing a set of instructions (sequential or otherwise) that specify actions to be taken by that computer. Further, while only a single computer is illustrated, the term "computer" may also include any collection of computers that individually or jointly execute a set (or multiple sets) of instructions to perform any one or more of the methodologies discussed herein.

Exemplary computer 112 includes processor 202, main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and data storage device 218, which communicate with each other via bus 232.

Processor 202 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 202 may also be one or more special-purpose processing devices such as an application specific integrated circuit (ASIC), a field programmable gate array (FPGA), a digital signal processor (DSP), a network processor, or the like. Processor 202 may be configured to execute processing logic 226 for performing various operations and steps discussed herein.

Computer 112 may further include a network interface device 208. Computer 112 also may include video display 210 (e.g., a liquid crystal display (LCD) or a cathode ray tube (CRT)), alphanumeric input device 212 (e.g., a keyboard), cursor control device 214 (e.g., a mouse), and signal generation device 216 (e.g., a speaker).

Data storage device 218 may include machine accessible storage medium 230 (also known as a non-transitory computer-accessible storage medium, a non-transitory computer-readable storage medium, or a non-transitory computer-readable medium) on which is stored one or more sets of instructions (e.g., a predictive caching module, which may be configured to carry out the steps illustrated in FIG. 3) embodying any one or more of the methodologies or functions described herein. A predictive caching module may also reside, completely or at least partially, within main memory 204 and/or within processing device 202 during execution thereof by computer 112. Instructions 222 (e.g., predictive caching module) may further be transmitted or received over network 110 via network interface device 208.

While machine-accessible storage medium 230 is shown in an exemplary embodiment to be a single medium, the term "machine-accessible storage medium" should be understood to include a single medium or multiple media (e.g., a centralized or distributed database, and/or associated caches and servers) that store the one or more sets of instructions. The term "machine-readable storage medium" shall also be understood to include any medium that is capable of storing, encoding, or carrying a set of instructions for execution by the computer and that cause the computer to perform any one or more of the methodologies of the present invention. The term "computer-readable storage medium" shall accordingly be understood to include, but not be limited to, solid-state memories, optical and magnetic media.

Exemplary System Operation

Figure 3:
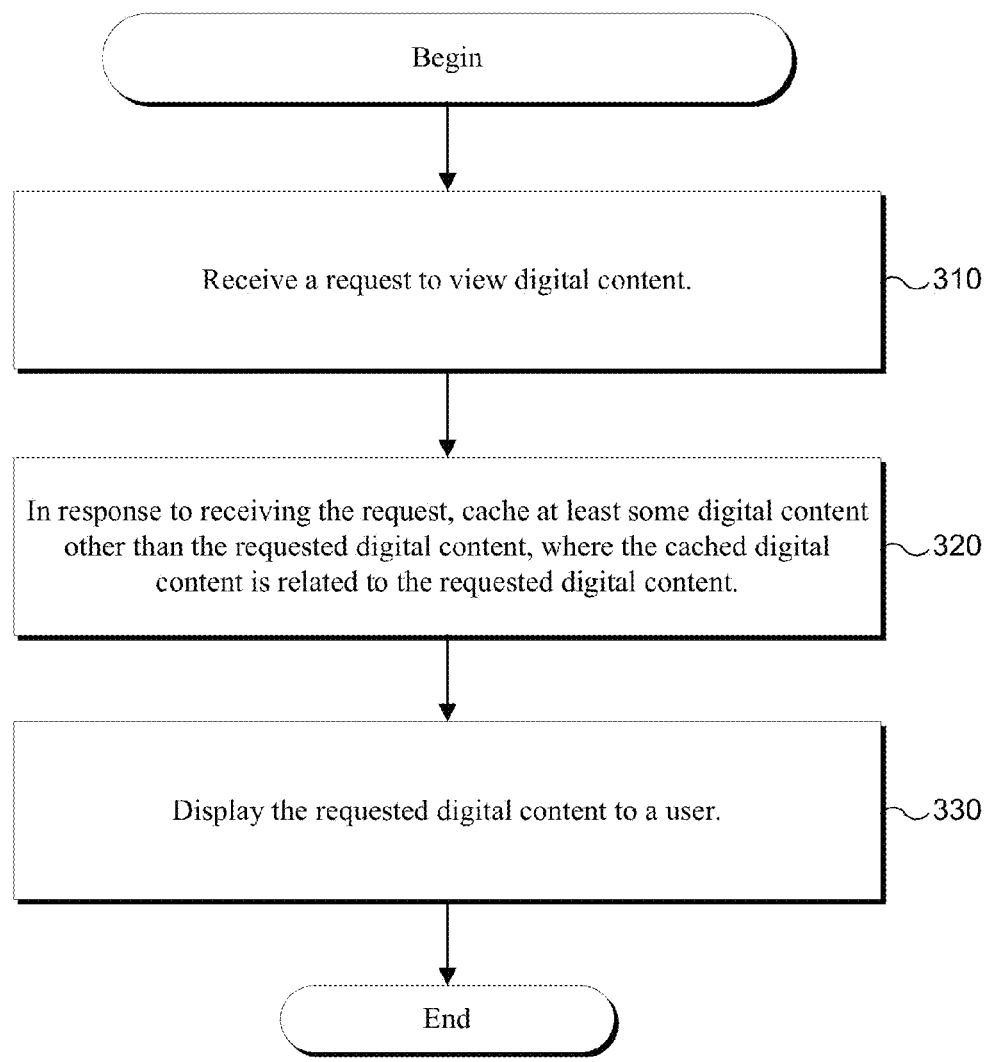
FIG. 3 shows a flow chart that generally illustrates various steps executed by a predictive caching module that, for example, may be executed by the content management server of FIG. 1.

Mobile device 106 and content management server 112 may alone, or in combination, perform the method steps of FIG. 3. It should be understood by reference to this disclosure that these methods describe exemplary embodiments of the method steps carried out by the present system, and that other exemplary embodiments may be created by adding other steps, by removing one or more of the method steps shown in FIG. 3, or by performing the method steps in an alternate order.

FIG. 3 shows processing functions performed by an exemplary predictive caching module, in accordance with various embodiments, that predictively caches digital content (e.g., such as files, folders of files, nested files, etc.) that a user is likely to access (e.g., on the user's mobile device 106). Beginning at Step 310, the system receives a request to access digital content. The request to access digital content may include, for example, a request by a user to access one or more files within a particular folder on the user's mobile device 106 or on another computing device. In various embodiments, the user may request to view a listing of files and folders in a particular folder, which may include thumbnails (e.g., preview images) of the various files and folders within the particular folder. In particular embodiments, the system may receive a request to view a particular image file in a folder containing a plurality of image files.

The system continues, at Step 320, by, in response to receiving the request at Step 310, caching at least some digital content other than the requested digital content (e.g., on the mobile device 106), where the cached digital content may be related to the requested digital content. The cached digital content may be related to the requested digital content in any way. In a particular embodiment, the cached digital content is related to the requested digital content in that both the cached and requested digital content are stored in the same folder. In other embodiments, the requested digital content is a listing of files or folders in a particular folder, and the system is configured to cache the contents of any files or folders in the listing. For example, where the requested digital content is a folder containing word documents, the system may cache the contents of the word documents in the folder, so that a request to open one of the word documents by a user can be served by the system more quickly.

The system may be configured to cache digital content that is related to the requested digital content because the cached digital content is content that the system determines that the user may like to access in the same approximate timeframe as the requested digital content. As a particular example, in various embodiments, when a user is accessing images in a particular folder (e.g., viewing the images one at a time by browsing through the images in the particular folder using a mobile device associated with the user) the system may cache a number of images (e.g., ten images, or any other suitable number of images) that follow the image that the user is currently viewing in a stored sequence of images as well as a number of images that precede the image that the user is currently viewing in the stored sequence of images. In such embodiments, this caching may allow users to quickly view images in a folder by caching images that the user is not currently viewing, but that the user may likely view in the near future as the user cycles through and views a related series of images. Similar techniques may be used in conjunction with file types other than images, such as music files and documents.

In various embodiments, the system may be configured to determine digital content that the user may be likely to access based on tendencies (e.g., computer usage habits) of the user. In particular embodiments, tendencies of the user may include a manner in which the user typically accesses digital content, cycles through digital content (e.g., from one image to another), etc. For example, a particular user may cycle between image files in a folder of image files by, when viewing the image files on a mobile device, gesturing (e.g., swiping) from right to left on a touchscreen associated with the mobile device. In this example, the system may be configured to cache image files (e.g., up to a predetermined number of image files, such as ten image files) to the right of the image that the user is currently viewing because it may be likely that such a user may progressively view images to the right of the currently viewed image. The system may further be configured to cache images files to the left of the image that the user is currently viewing (e.g., up to a predetermined number, such as five image files) because it may be likely that the user may go back to re-view images that the user has just viewed.

In various embodiments, the system may be configured to determine digital content that the user may be likely to access based on a region in which the user is located. It is noted that users from different regions may be more likely to scroll through files in one direction or another which may be based on the direction in which those users read their native language (e.g., right-to-left vs. left-to-right). For example, in certain regions, the local language may be read from left to right (e.g., England, Spain, etc.), while in other regions, the local language may be read from right to left (e.g., Israel or Saudi Arabia). In various embodiments, the system uses the above, region-based, reading habits to predict which direction a user from a particular region will move in when sequentially accessing a related series of files (e.g., a listing of files or group of thumbnailed files).

For example, for users based in the United States (where most residents speak a language that is read left-to right), the system may cache a relatively large number of files that are displayed to the right of the file that is currently being displayed, and a relatively small number of files that are displayed to the left of the file that is currently being displayed. Similarly, for users based in Israel (where most residents speak a language that is read right-to-left), the system may cache a relatively large number of files that are displayed to the left of the file that is currently being displayed, and a relatively small number of files that are displayed to the right of the file that is currently being displayed.

Returning to Step 330, the system continues by displaying the requested digital content to a user. The user may be a user that requested to access the digital content, or any other user. In particular embodiments, the system may be configured to display the requested digital content in any suitable manner (e.g., on a display associated with a mobile device, laptop, tablet, etc.).

Exemplary User Experience

Figure 4:
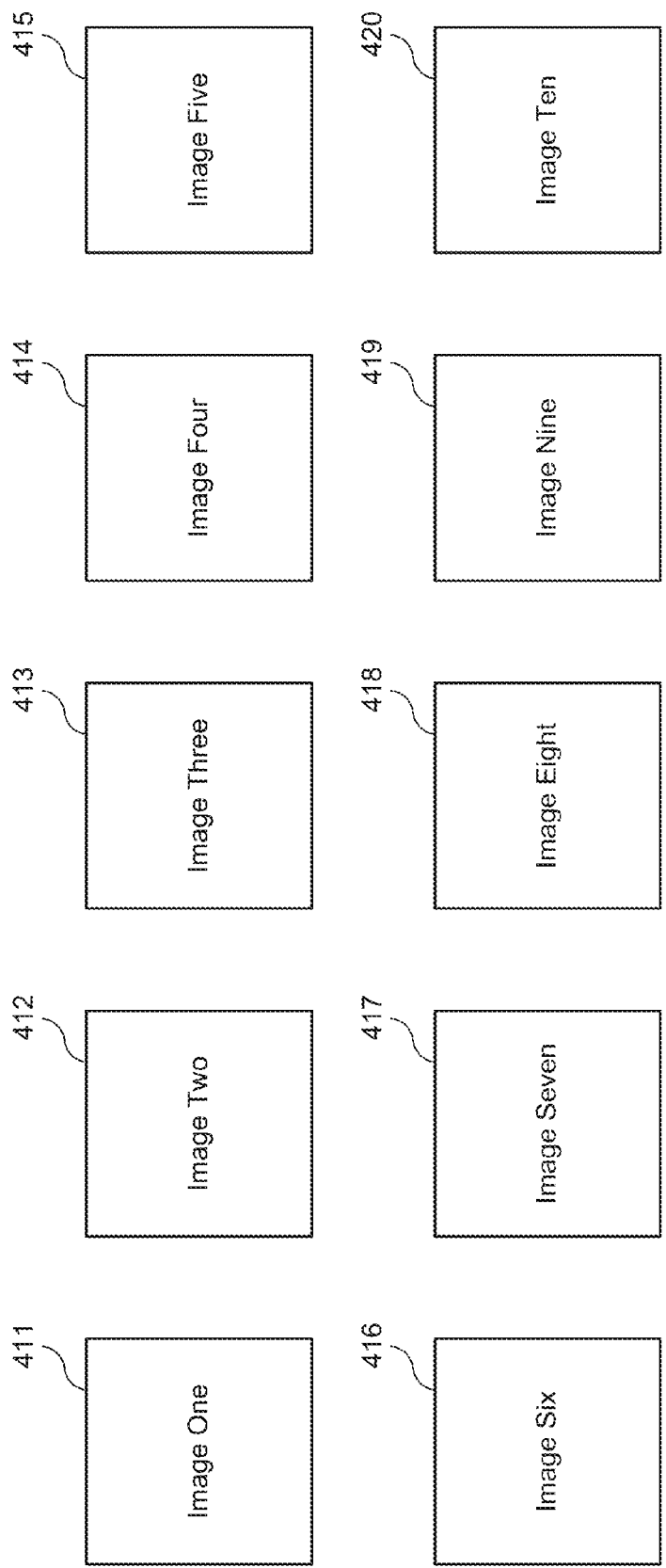
FIG. 4 shows a screen shot of thumbnail representations of ten images. This screen shot may depict the screen of a mobile device, or other suitable computing device.

FIG. 4 shows a folder of image files (e.g., as displayed in a folder on a mobile computing device). As may be understood from this figure, a user may select images in the folder to view, which may result in the system displaying the image in a full-screen view to the user. If, for example, the user selected image three 413, the system may be configured to display "image three" 413 in a full-screen view. When viewing an image (e.g., such as image three 413) in full-screen view, the system may be configured to allow the user to cycle through the other images in the folder while remaining in full-screen mode (e.g., by clicking on arrows on the screen to scroll to the next or previous image, by gesturing between images using a touch screen associated with the device on which the user is viewing the images, etc.).

When the user is viewing image three 413 in a full-screen view, the system may be configured to predictively cache images that precede and follow image three 413 in the sequence shown in FIG. 4 in order to allow the user to substantially seamlessly cycle through the images. As discussed in more detail above, the system may predictively cache the images based on the image viewing tendencies of the current user. In this example, if the user typically cycles through images by gesturing from right to left (e.g., to view the image that immediately follows the image that the user is currently viewing), the system may be configured to cache at least the next sequential image in the folder (e.g., image four 414). In particular embodiments, the system may be configured to cache the next five images in the sequence shown in FIG. 4 (e.g., images four 414, five 415, six 416, seven 417, and eight 418), or any other suitable predetermined number of images. The system may be further configured to cache at least one image that precedes image three 413 in the sequence shown in FIG. 4 (e.g., image two 412) in case the user elects to go back and view previous images.

In various embodiments, the system may be configured to dynamically cache images in the above example based on the image that the user is currently viewing. For example, if the current user typically gestures from right to left to cycle through images, the system may maintain in cache the five images that are sequentially located to the right of the image that the user is currently viewing as well as the two images that that are located sequentially to the left of the image that the user is currently viewing. Accordingly, the images that the system caches may change dynamically over time as the user accesses different images. It should be understood that the system may be configured to cache differently for users with different file viewing tendencies (e.g., users that may typically view files from left to right, scroll up or down, etc.). Also, users' viewing tendencies may be determined, for example, based on: (1) the current location of the user; (2) tendencies that the system automatically identifies as the user uses the system; or (3) tendencies and/or preferences that the user manually enters into a user interface associated with the system.

Figure 5:
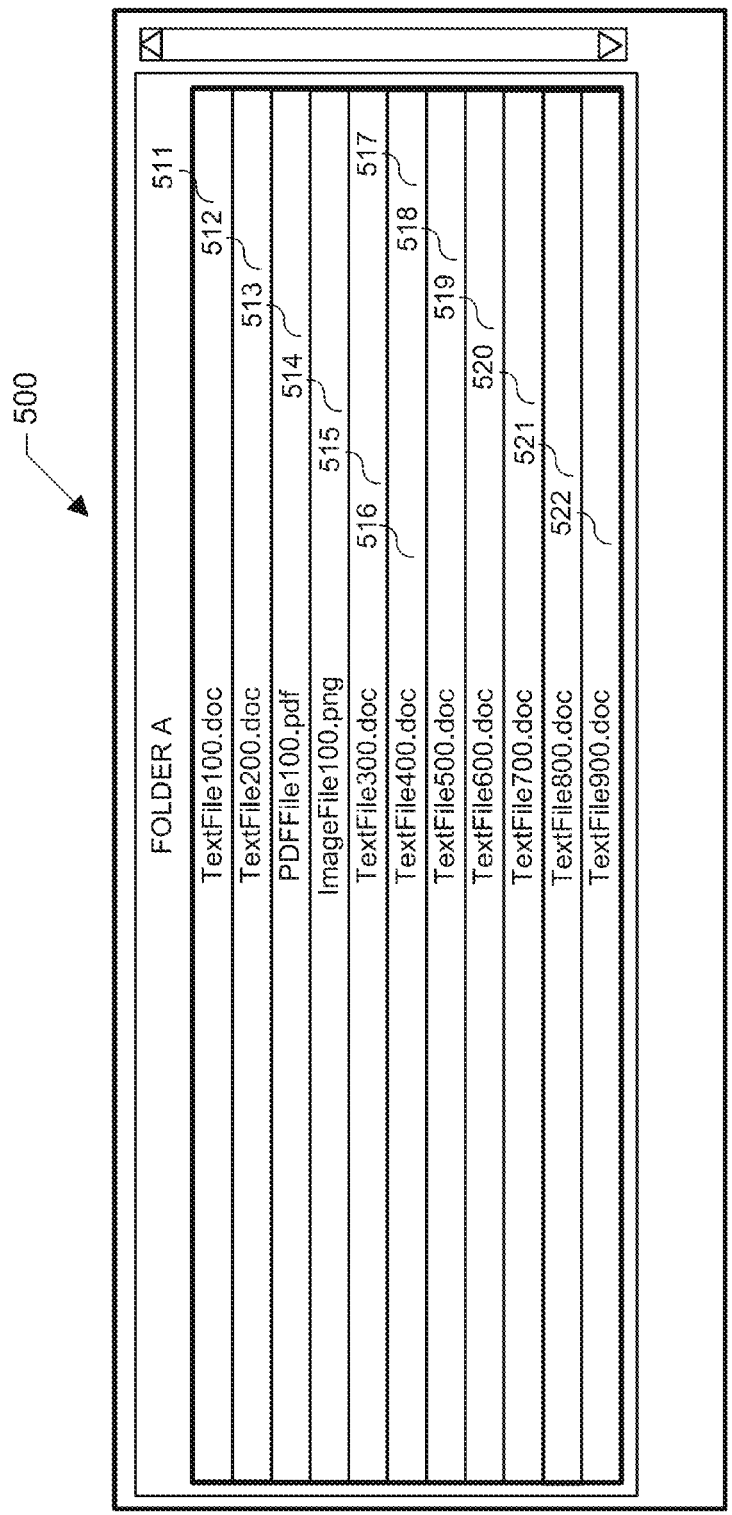
FIG. 5 shows a screen shot of representations of a series of files stored within a folder.

FIG. 5 shows a listing of digital content in a directory 500 displayed on the mobile computing device 106 or other device. As may be understood from this figure, the system may be configured to allow a user to select files and folders in the directory and to scroll down to access files and folders in the directory that are not shown on the screen shown in FIG. 5. In various embodiments, the system may be configured to predictively cache the digital content contained in the listing of files that is currently displayed to the user on a display screen, or related files that are not shown on the screen. For example, in the file listing shown in FIG. 5, the system may be configured to cache the individual files in listing (e.g., such as the image files, PDFs, and other documents) 511-522. The system may be further configured to cache digital content in the folder that is not currently displayed to the user, but that the user may be likely to scroll to (e.g., digital content that would appear before or after the currently displayed files and folders in the listing of files and folders). Predictive caching of digital content that the user may be likely to scroll to may include, for example, caching of the digital content itself or caching of a thumbnail or preview of the digital content.

CONCLUSION

Having the benefit of the teachings presented in the foregoing descriptions and associated drawings, one of skill in the art will recognize many modifications and other embodiments of the invention. For example, while certain examples discussed above are discussed in regard to image files, similar systems and methods may be used in conjunction with other types of files, such as text files, music files, or other files. In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

We claim:

1. A computer system comprising:
at least one processor; at least one memory having instructions stored thereon that are executable so the computer system:
wherein the computer system stores at least one particular digital file in a synched online content management system:
receives at the synched online content management system, from a user of a client device, a request to access the at least one particular digital file stored on a remote server through a network connection;
stores at least one second digital file in the synched content management system;
determines a relationship between the at least one particular digital file in the synched online content management system and the at least one second digital file in the synched online content management system, wherein the relationship includes a sequence involving both the at least one particular digital file and the at least one second digital file;
selects, via the synched content management system, the at least one second digital file in the synched online content management system to cache locally on the client device based on the relationship between the at least one particular digital file and the at least one second digital file and further based on at least one file-accessing tendency of the user, including the request to access at least one particular digital file, and a regional based reading habit, wherein the regional based reading habit includes both a manner in which digital content is typically accessed and a direction in which the user reads in their native language, thereby predictively caching digital files displayed to the right of the at least one particular digital file when the native language is read from right-to-left and predictively caching digital files displayed to the left of the at least one particular digital file when the native language is read from left-to-right and wherein the at least one second digital file follows the requested at least one particular digital file in the sequence of files, the sequence predicted by the regional based reading habit;
downloads the at least one second digital file from the remote server to the client device; and
saves the downloaded at least one second digital file to the at least one memory associated with the client device for later access by the user.

2. The computer system of claim 1, wherein the instructions for the receive, the select, the download, and the save steps are executed by the remote server.

3. The computer system of claim 1, wherein the at least one particular digital file includes a digital file that immediately follows the requested at least one particular digital file in a sequence of files.

4. The computer system of claim 1, wherein selecting further includes: choosing, via a direction of cycling through digital files on a user interface, to cache the at least one second digital file, wherein the at least one second digital file is displayed to the right of the at least one particular file on the user interface when the direction of cycling is based reading habit in a native language that is read from left-to-right, or wherein the at least one second digital file is displayed to the left of the at least one particular file on the user interface when the regional based reading habit is premised on a native language that is read from right-to-left.

5. The computer system of claim 1, wherein the instructions for the download and the save steps are executed by the client device.

6. The computer system of claim 5, wherein the client device is a mobile computing device.

7. The computer system of claim 1, wherein the at least one file-accessing tendency of the user includes a manner in which the user typically cycles through files.

8. The computer system of claim 7, wherein the system is adapted to determine the at least one file-accessing tendency based on a location of the user.

9. The computer system of claim 7, wherein the system is adapted to determine the at least one file-accessing tendency based on the user's native language.

10. The computer system of claim 7, wherein the system is adapted to determine the at least one file-accessing tendency based on the user's past content-accessing practices.

11. The computer system of claim 7, wherein the system is adapted to determine the at least one file-accessing tendency based on at least one user preference received from the user.

12. A computer-implemented method of predictively caching digital content, the method comprising:
- storing particular digital content in a synched online content management system;
- receiving, by a processor of the synched online content management system, from a user of a client device, a request to access the particular digital content stored on a remote server through a network connection;
- storing at least one second particular digital content in the synched online content management system;
- determining a relationship between the particular digital content in the synched online content management system and the at least one second particular digital content in the synched content management system, wherein the relationship includes a sequence involving both the particular digital content and the at least one second particular digital content;
- selecting, by a processor of the synched online content management system, the at least one second particular digital content stored on the remote server to cache locally based on the relationship between the particular digital content and the at least one second particular digital content and further based on at least one content-accessing tendency of the user, including the request to access particular digital content, and a regional based reading habit, wherein the regional based reading habit includes a manner in which digital content is typically accessed and a direction in which a user reads in their native language, thereby predictively caching digital files displayed to the right of the particular digital content when the native language is read from right-to-left and predictively caching digital files displayed to the left of the particular digital content when the native language is read from left-to-right and wherein the at least one second particular digital content follows the requested particular digital content in the sequence of files, the sequence predicted by the regional based reading habit;
- downloading the at least one second particular digital content from the remote server to at least one memory associated with the client device; and
- saving the downloaded at least one second particular digital content to the at least one memory associated with the client device for later access by the user.

13. The method of claim 12, wherein the downloading and saving steps are executed by one or more processors of the client device.

14. The method of claim 12, wherein the selected at least one second particular digital content includes digital content that immediately follows the requested particular digital content in a predetermined sequence.

15. The method of claim 12, wherein: the requested digital content comprises at least one image.

16. The method of claim 12, wherein the at least one content-accessing tendency of the user includes a manner in which the user typically cycles through files.

17. The method of claim 16, further including determining the at least one content-accessing tendency based on one or more factors selected from a group consisting of:
- a location of the user;
- the user's native language;
- the user's past content-accessing practices; and
- at least one user preference received from the user.

18. A non-transitory computer-readable medium storing computer-executable instructions for:
- storing particular digital content in a synched online content management system;
- receiving, from a user, a request at the synched online content management system to access particular digital content stored on a remote server through a network connection;
- storing at least one second particular digital content in the synched online content management system;
- determining a relationship between the particular digital content in the synched online content management system and the at least one second particular digital content in the synched online content management system, wherein the relationship includes a sequence involving both the particular digital content and the at least one second particular digital content;
  - selecting the at least one second particular digital content to cache locally based on the relationship between the particular digital content and at least one second particular digital content and further based on at least one content-accessing tendency of the user, including the request to access the at least one second particular digital content, and a regional based reading habit, wherein the regional based reading habit includes both a manner in which digital content is typically accessed and a direction in which a user reads in their native language, thereby predictively caching digital contents displayed to the right of the particular digital content when the native language is read from right-to-left and predictively caching digital contents displayed to the left of the particular digital content when the native language is read from left-to-right and wherein the at least one second particular digital content follows the requested particular digital content in the sequence of files, the sequence predicted by the regional based reading habit;
- downloading the at least one second particular digital content from the synched online content management system to at least one local memory associated with a mobile device; and
- saving the downloaded at least one second particular digital content to the at least one local memory associated with a mobile device for later access by the user.

19. The non-transitory computer-readable medium of claim 18, further storing computer-executable instructions for determining the at least one content-accessing tendency based on one or more factors selected from a group consisting of:
- a location of the user;
- the user's native language;
- the user's past content-accessing practices; and
- at least one user preference received from the user.

* * * * *